UNITED STATES PATENT OFFICE.

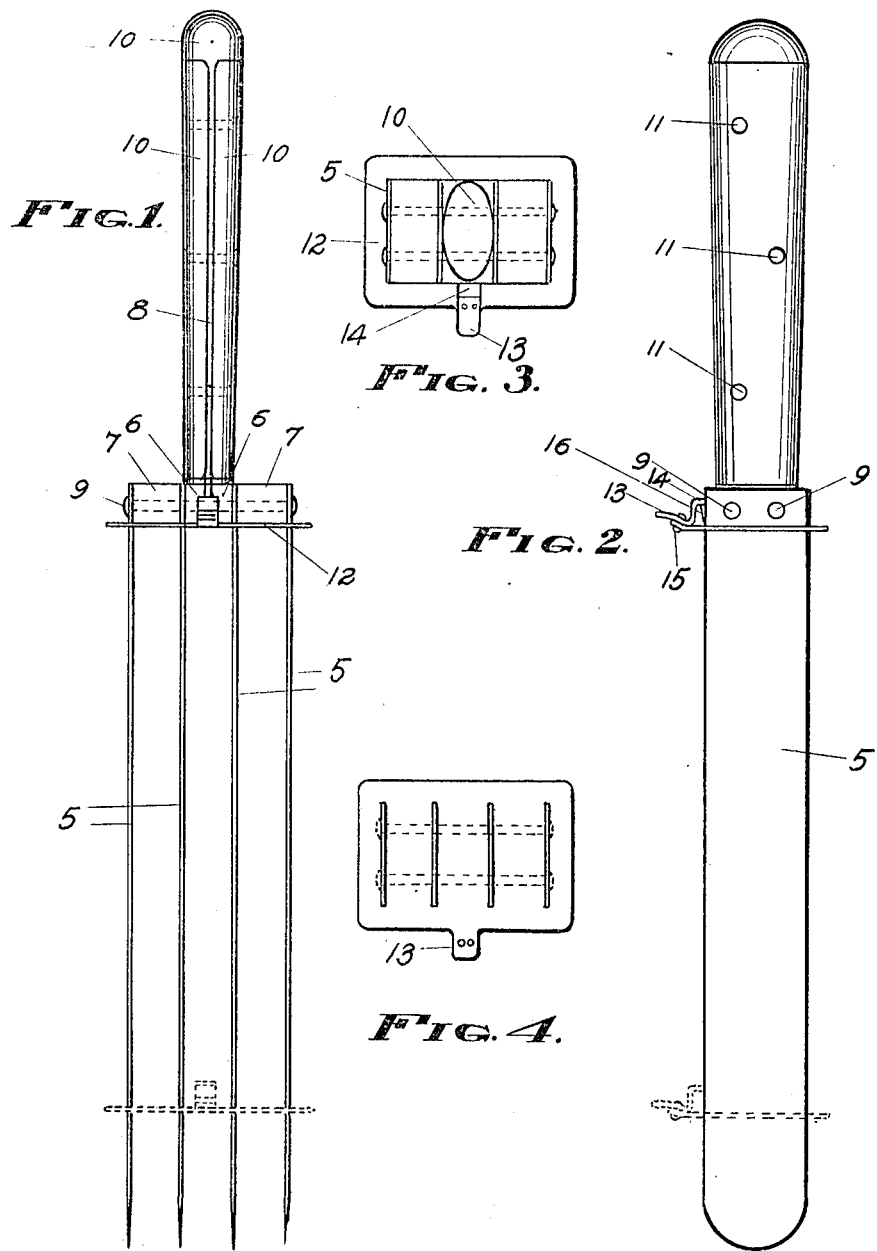

FLORA A. PRESTON, OF KIRKSVILLE, MISSOURI.

MULTIPLE CULINARY KNIFE.

1,280,835.      Specification of Letters Patent.      Patented Oct. 8, 1918.

Application filed February 24, 1917. Serial No. 150,863.

*To all whom it may concern:*

Be it known that I, FLORA A. PRESTON, a citizen of the United States, residing at Kirksville, in the county of Adair and State of Missouri, have invented certain new and useful Improvements in Multiple Culinary Knives, of which the following is a full, clear, and exact description, such as will enable others skilled in the art to which it appertains to make and use the same.

The invention relates to multiple culinary knives and seeks to provide a simple and efficient multiple knife together with means to strip and clean the blades of the knife from any dough or other clinging material that may gather thereon as the knife is used.

Certain kinds of cake dough and many other materials employed in the pastry and culinary arts are greatly improved by cutting into fragments or small pieces and by cutting the fiber or grain of the dough and other material instead of kneading or stirring. A single blade knife is commonly employed for the foregoing purposes. It is essential that a suitable multiple blade knife be provided to expedite the process of cutting and reducing dough and other articles, and that a suitable means be provided to strip and clean or scrape any clinging material from the blades of the knife.

The present invention seeks to provide an improved form of multiple blade culinary knife for cutting and reducing and mixing dough and other material, together with means for scraping and stripping any clinging material from the blades of the knife.

With these and other objects in view, the invention consists in the features of construction, combinations and arrangements of parts hereinafter set forth and more particularly pointed out in the appended claims, the accompanying drawings illustrating the preferred form of the invention.

In the drawings:—

Figure 1 is a view of the improved multiple knife showing one edge of the blades.

Fig. 2, is a view of the knife showing the flat side of one of the blades.

Fig. 3 is an end view of the knife showing the handle end.

Fig. 4, is an end view of the knife showing the blade end.

The blades 5 are duplicate and spaced by the spacing blocks 6 and 7, the central member 8 of the handle positioned between the spacing blocks 6 and the rivets 9 passing through the blades and the central member of the handle and all the spacing blocks and securely binding and holding them in relative rigid position, the member 10 of the handle being secured to the central member 8 by the rivets 11 and forming a suitable handle to grasp in the hand.

The scraping and stripping plate 12 fits closely to and around the blades 5 and projects therefrom in all directions as shown, the integral handle 13 and latch 14 being secured to the stripping plate by the rivet 15, and the beveled catch lugs 16 preferably integral with the spacing blocks 6 is so positioned that when the stripping plate is raised to the position shown in Fig. 1, the latch 14 will engage with the catch lug 16, there being sufficient resiliency in the catch plate so that a downward pressure on the handle 13 will unlatch the latch 14 from the catch lug and allow the stripping plate to be moved along the blades 5 as indicated by the positions of the plate shown in dotted lines of Figs. 1 and 2, it being understood that the stripping plate is easily removed from the blades when desired for cleaning purposes or other reasons, by simply still further moving it along the blades.

The improved multiple knife is employed for cutting and mixing dough and other material in the same manner as the single blade knife which is well known, it being apparent that four blades will be four times as efficient as one blade and that more than four blades can be employed in the same manner when desired.

When the space between the blades become so filled with dough or any clinging material as to decrease the efficiency of the knife, the handle 13 is pressed downward and with a single movement the latch 14 is released from the lug 16 and the stripping plate 12 moved along the blades 5 a sufficient distance to remove the obstruction, it being obvious that with the same movement the stripping plate can be entirely removed from the blades.

The stripping plate is then returned to the position shown in full lines of Figs. 1 and 2 with a single movement and the latch 14 automatically engages the lug 16 and the knife is ready for further efficient use.

What I claim as new, and desire to secure by Letters Patent is:—

1. In a culinary knife, a plurality of blades rigidly secured in parallel relations, a handle rigid with said blades, a stripping plate fitting around said blades and projecting therefrom, a catch lug rigid with said handle, and a spring latch rigidly secured to said stripping plate and positioned to engage said lug.

2. In a culinary knife, a plurality of blades rigidly secured in parallel relation, a handle rigid with said blades, a stripping plate fitting around said blades and projecting therefrom, a lug rigid with said handle, a spring latch rigidly secured to said stripping plate and arranged to automatically lock said stripping plate adjacent said handle, said latch sufficiently resilient to disengage said stripping plate by pressure thereon in the direction of the projection of said blades.

FLORA A. PRESTON.